C. P. TOWNSEND.
METHOD OF MAKING HYDROCHLORIC ACID.
APPLICATION FILED MAR. 1, 1920.
1,414,762. Patented May 2, 1922.
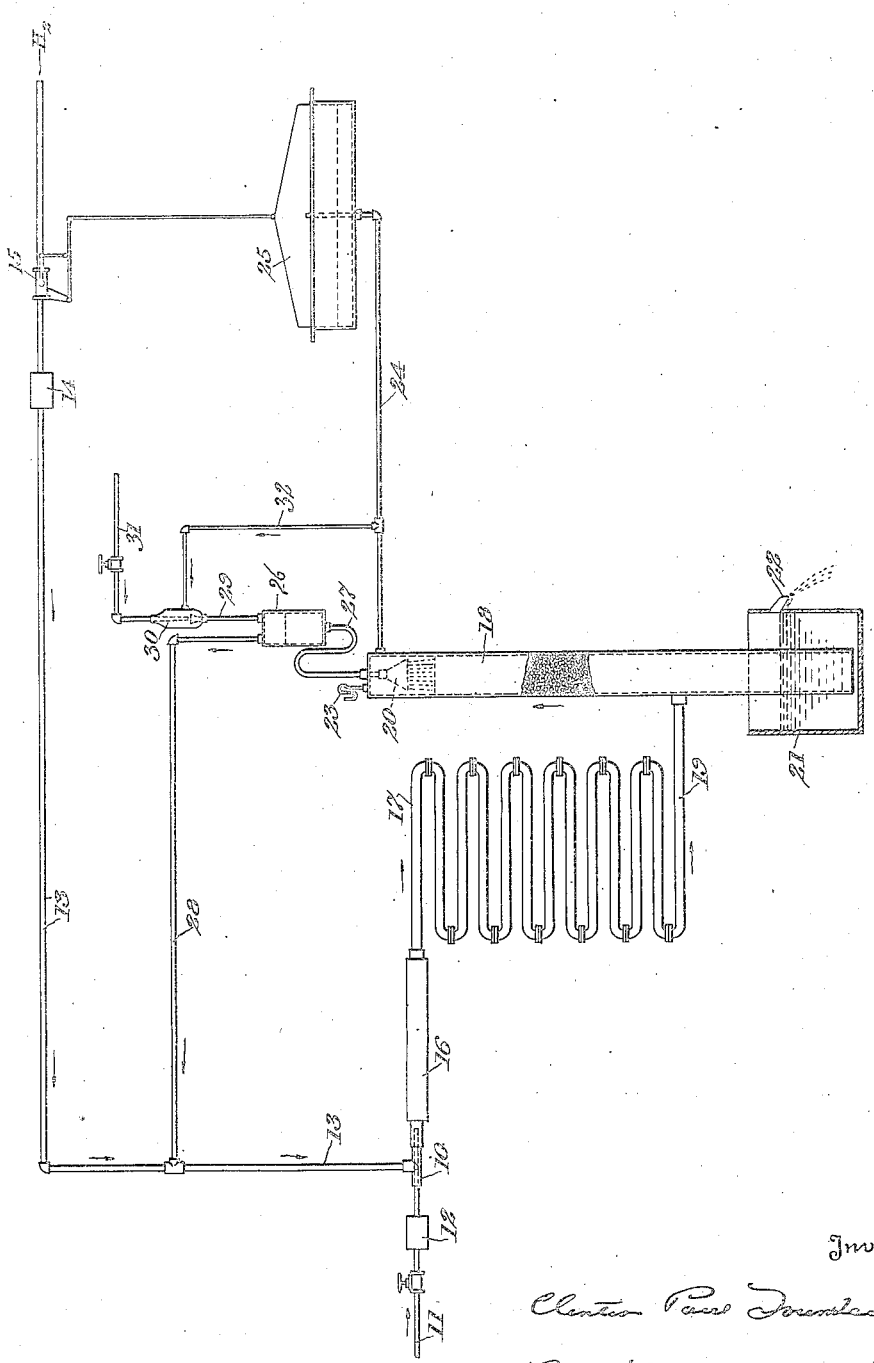

UNITED STATES PATENT OFFICE.

CLINTON PAUL TOWNSEND, OF WASHINGTON, DISTRICT OF COLUMBIA, ASSIGNOR TO HOOKER ELECTROCHEMICAL COMPANY, OF NEW YORK, N. Y., A CORPORATION OF NEW YORK.

METHOD OF MAKING HYDROCHLORIC ACID.

1,414,762.  Specification of Letters Patent.  Patented May 2, 1922.

Application filed March 1, 1920. Serial No. 363,257.

*To all whom it may concern:*

Be it known that I, CLINTON PAUL TOWNSEND, a citizen of the United States, residing at Washington, in the District of Columbia, have invented certain new and useful Improvements in Methods of Making Hydrochloric Acid, of which the following is a specification.

This invention is a novel method of making hydrochloric acid, including aqueous solutions thereof, by the direct union of hydrogen and chlorin. A primary object of the invention is to provide a method whereby hydrogen and chlorin may be caused to unite in theoretical proportions in a system which is or may be closed in so far as any substantial or material gas exit is concerned.

It is well known that chlorin may be burned in an atmosphere of hydrogen, or that chlorin and hydrogen may be caused to unite with production of a flame, the immediate product of the reaction being gaseous hydrochloric acid, HCl: and this operation is at present employed in the commercial manufacture of hydrochloric acid, the gaseous hydrochloric acid being absorbed from the effluent gases by means of water in any appropriate tourril or tower or tourril and tower system. In the commercial manufacture of hydrochloric acid by this method it is practically necessary to employ hydrogen in very material excess of the reacting proportions, since contamination of the acid product or pollution of the atmosphere by chlorin is thereby best avoided. Such procedure is, however, obviously wasteful as regards consumption of hydrogen except as provision may be made for the return of excess hydrogen to the burner. Furthermore the chlorin employed is as a rule diluted to a greater or less extent by air or oxygen, which involves further losses of hydrogen by combination with oxygen, and further losses of hydrochloric acid in the exit gases, or at least expensive extensions of the scrubber system for treating the exit gases, the volume of which is of course increased in proportion to the presence of nitrogen or other inert gases.

According to the present invention, chlorin and hydrogen, both of which should preferably be substantially undiluted, although they need not necessarily be dry, are caused to unite in a system which is substantially or wholly closed to the escape of gas; the chlorin being admitted to the system in a regulated and substantially constant stream, whereas the admission of hydrogen is so regulated and controlled as to maintain a substantially constant pressure in the system, which pressure may be either atmospheric or super- or sub-atmospheric. Preferably a suitable pressure regulator is provided in the system, and operates by controlling the inflow of hydrogen from an external source.

The accompanying drawing, which is diagrammatic in character, illustrates one form of apparatus adapted for carrying the method into effect. Referring to said drawing:

10 indicates a burner which may be of silica or other appropriate material, and which receives chlorin gas (preferably substantially pure chlorin evaporated from the liquid state) through a supply pipe 11 having a sensitive control valve and a metering device 12. In the preferred operating method the chlorin supply is maintained as nearly constant as practicable, and accordingly the chlorin supply valve may be either automatically or manually controlled as may be desired.

Hydrogen is supplied to the burner 10 through main 13, in which is a metering device 14 and a control valve 15, the latter preferably of the automatic type and controlled by the hydrogen gasometer 25 functioning as a pressure regulator. This regulator serves, as will be readily understood, to maintain a substantially constant pressure, whether atmospheric or above or below atmospheric, throughout the system.

16 is a combustion chamber for the hydrogen-chlorin flame, and may also be of silica ware. The acid gas first traverses a cooling system 17, and passes thence to the absorption system in which it is brought into contact with water for the production of aqueous acid solutions. The absorption system will of course be designed in accordance with the acid concentration desired: for simplicity of illustration it is diagrammatically illustrated as comprising a packed absorption tower 18, the HCl entering at the lower portion through conduit 19 while the water is sprayed in at the top as indicated at 20. The tower is closed at the bottom by a sealing-well 21 having an overflow 22 for the finished acid. The tower is also closed at the top and may carry a manometer or other pressure indicating device 23. The upper portion of the tower stands in direct connection through pipe 24 with the pressure-regulating gasometer 25.

26 is a hydrogen pressure chamber through which the absorbing water is introduced into the absorbing system 18. This chamber communicates at its bottom with the top of the absorbing tower 18 through a water-sealed pipe 27: at its upper portion it is connected by branch pipe 28 with the main hydrogen supply line 13, and by pipe 29 with a water injector 30. The latter receives its supply of water under pressure through valved pipe 31, and communicates through a branch pipe 32 and pipe 24 with the upper portion of the absorption tower 18.

The system as above described may be operated as follows:

Hydrogen is first admitted through the valve 15 and allowed to fill the system, displacing the air, whereupon the seals are filled and the system closed to access of air, the hydrogen supply valve remaining open until a slight positive pressure is noted at the manometer 23. The water injector 30 is then started in operation to supply water to the absorbing tower, at the same time by its injector action, drawing hydrogen from the tower through the branch pipe 32 and forcing it under slight presssure to the burner 10, through pipes 28 and 13, the flow of hydrogen being in the direction indicated by the arrows. Pure chlorin is then admitted in regulated and constant supply through the supply line 11, and the burner flame started in any convenient manner, for example by an electric igniter. The hydrogen is initially in relatively large excess as compared with the chlorin, thereby insuring complete combination of the latter and an acid free from uncombined chlorin. This acid gas with the accompanying excess of hydrogen passes through cooling coils 17 to the absorption tower 18, in which the hydrochloric acid is absorbed, the aqueous acid overflowing from the well at 22. The hydrogen circulates continuously through the system in the manner already described. In the meantime additional hydrogen is admitted to the system through the valve 15 in quantity just sufficient to maintain the desired and established pressure within the system. Inasmuch as the amount of hydrogen required to maintain a constant pressure (whether positive or negative) within the system is the amount required to replace the hydrogen which has been withdrawn from the system through combination with chlorin, it will be readily understood that in the continued operation of the system, and neglecting accidental losses through leakage, etc., the hydrogen and chlorin are supplied to the system in the theoretical combining proportions, although the combination takes place at all times in presence of a maintained excess of hydrogen.

The invention is not of course limited to the employment of the particular circulating system described by way of example, it being necessary only that the chlorin should be supplied in a regulated and preferably constant stream to combine with a portion of the confined body of hydrogen; and that the pressure within the system should be constantly maintained by the supply of hydrogen in amount sufficient to replace that withdrawn from the system through combination with chlorin and removal of the resulting acid.

Any appropriate method may be employed for controlling or increasing the concentration of the acid: for example the acid effluent or any portion thereof may be re-circulated through the absorbing system; or the water may be re-circulated from the pressure chamber 26 through the injector 30, allowing only a limited overflow to the absorbing tower 18, this overflow regulated in accordance with the concentration of the acid desired.

I claim:

1. Method of producing hydrochloric acid comprising confining a body of hydrogen in a substantially closed system; supplying chlorin to the system at substantially constant rate and effecting its combination with a portion of the hydrogen; withdrawing the resulting hydrochloric acid from the system; and maintaining the desired pressure within the system by the regulated supply of hydrogen thereto.

2. Method of producing hydrochloric acid comprising circulating a body of hydrogen through a substantially closed system; supplying chlorin to the system at substantially constant rate and effecting its combination with a portion of the hydrogen; withdrawing the resulting hydrochloric acid from the system; and maintaining the desired pressure within the system by the regulated supply of hydrogen thereto.

3. Method of producing hydrochloric acid comprising confining a body of hydrogen in a substantially closed system; supplying chlorin to the system at substantially constant rate and effecting its combination with a portion of the hydrogen; withdrawing the resulting hydrochloric acid from the system; and utilizing the pressure within the system to control automatically the supply of hydrogen thereto.

In testimony whereof, I affix my signature.

CLINTON PAUL TOWNSEND.